US012661586B2

(12) United States Patent
Mu

(10) Patent No.: US 12,661,586 B2
(45) Date of Patent: Jun. 23, 2026

(54) METHOD, APPARATUS, COMPUTER DEVICE AND STORAGE MEDIUM FOR INTERACTION CONTROL

(71) Applicant: Beijing Zitiao Network Technology Co., Ltd., Beijing (CN)

(72) Inventor: Qinyu Mu, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 212 days.

(21) Appl. No.: 18/465,033

(22) Filed: Sep. 11, 2023

(65) Prior Publication Data

US 2024/0082716 A1 Mar. 14, 2024

(30) Foreign Application Priority Data

Sep. 14, 2022 (CN) .......................... 202211117389.9

(51) Int. Cl.
*A63F 13/25* (2014.01)
*A63F 13/533* (2014.01)
*A63F 13/5372* (2014.01)
(52) U.S. Cl.
CPC ........ *A63F 13/533* (2014.09); *A63F 13/5372* (2014.09)
(58) Field of Classification Search
CPC .......... A63F 13/25; A63F 13/40; A63F 13/44; A63F 13/45; A63F 13/46; A63F 13/50;
(Continued)

(56) References Cited

U.S. PATENT DOCUMENTS

| | | | | |
|---|---|---|---|---|
| 12,274,943 B2* | 4/2025 | Lin | ......................... | A63F 13/52 |
| 2014/0329602 A1* | 11/2014 | Hisaoka | .................. | A63F 13/44 |
| | | | | 463/42 |
| 2022/0047941 A1* | 2/2022 | Chen | ..................... | A63F 13/837 |

FOREIGN PATENT DOCUMENTS

| | | |
|---|---|---|
| CN | 111265870 A | 6/2020 |
| CN | 111905363 A | 11/2020 |

(Continued)

OTHER PUBLICATIONS

China National Intellectual Property Administration, Patent Grant Issued in Application No. 202211117389.9, Sep. 23, 2024, 4 pages.

(Continued)

*Primary Examiner* — Omkar A Deodhar
(74) *Attorney, Agent, or Firm* — Alleman Hall LLP

(57) ABSTRACT

A method for interaction control comprises displaying a virtual scene, first and second skill controls, and an information indication component in a display interface of a terminal device. the virtual scene includes a target virtual object, and the information indication component is associated with a target value and a plurality of value intervals. The method includes, in response to a trigger operation for the first skill control, based on the target value interval corresponding to the target value, determining the skill effect information of a first target skill corresponding to the first skill control, and controlling the target virtual object to release the first target skill based on the skill effect information, and updating the target values, and in response to a trigger operation for the second skill control, controlling the target value to enter a locked state referring to the target value remaining unchanged for a predetermined time.

20 Claims, 7 Drawing Sheets

(58) Field of Classification Search
CPC ...... A63F 13/5375; A63F 13/55; A63F 13/56;
A63F 13/58; A63F 2300/60; A63F
2300/61; A63F 2300/63; A63F 2300/65
See application file for complete search history.

(56) References Cited

FOREIGN PATENT DOCUMENTS

| | | | |
|---|---|---|---|
| CN | 112494955 | A | 3/2021 |
| CN | 112619145 | A | 4/2021 |
| CN | 112870694 | A | 6/2021 |
| CN | 113101638 | A | 7/2021 |
| CN | 114570021 | A | 6/2022 |
| EP | 2006764 | A2 | 12/2008 |
| JP | 5190152 | B1 | 4/2013 |

OTHER PUBLICATIONS

China National Intellectual Property Administration, Office Action
Issued in Application No. 202211117389.9, Jun. 20, 2024, 16 pages.
Lu, X. et al., "Rapid Detection of Moving Target in the Competitive
Networked Robots," ROBOT, vol. 33, No. 6, Nov. 1, 2011, 9 pages.
Contains English abstract.

* cited by examiner

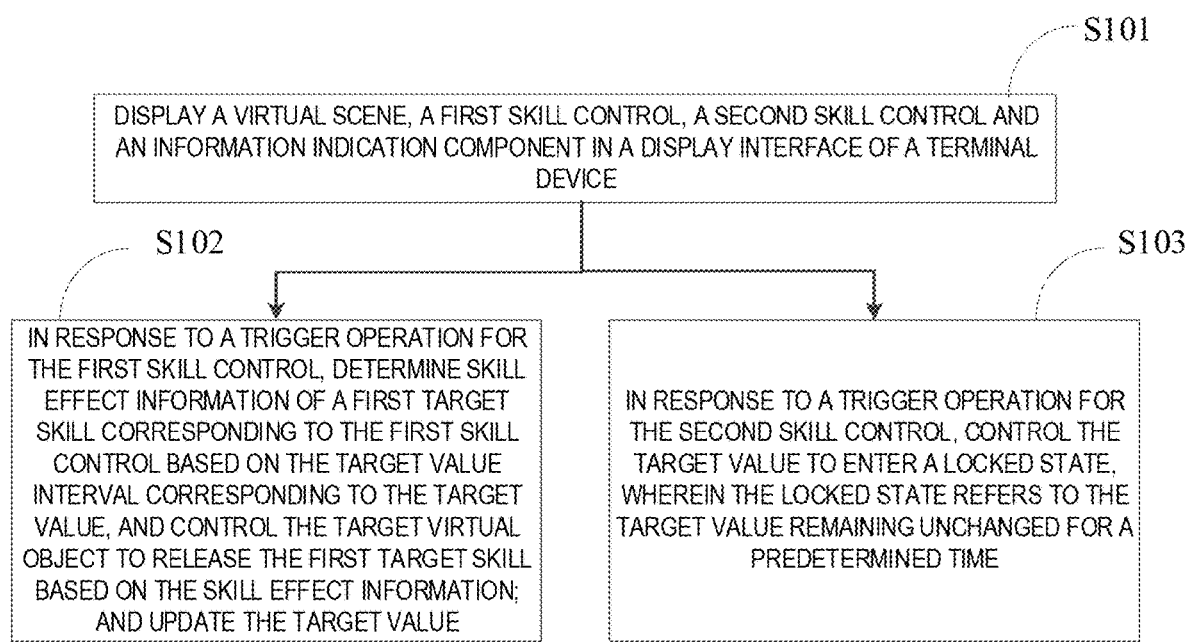

S101

DISPLAY A VIRTUAL SCENE, A FIRST SKILL CONTROL, A SECOND SKILL CONTROL AND AN INFORMATION INDICATION COMPONENT IN A DISPLAY INTERFACE OF A TERMINAL DEVICE

S102

IN RESPONSE TO A TRIGGER OPERATION FOR THE FIRST SKILL CONTROL, DETERMINE SKILL EFFECT INFORMATION OF A FIRST TARGET SKILL CORRESPONDING TO THE FIRST SKILL CONTROL BASED ON THE TARGET VALUE INTERVAL CORRESPONDING TO THE TARGET VALUE, AND CONTROL THE TARGET VIRTUAL OBJECT TO RELEASE THE FIRST TARGET SKILL BASED ON THE SKILL EFFECT INFORMATION; AND UPDATE THE TARGET VALUE

S103

IN RESPONSE TO A TRIGGER OPERATION FOR THE SECOND SKILL CONTROL, CONTROL THE TARGET VALUE TO ENTER A LOCKED STATE, WHEREIN THE LOCKED STATE REFERS TO THE TARGET VALUE REMAINING UNCHANGED FOR A PREDETERMINED TIME

FIG. 1

SUB-AREAS
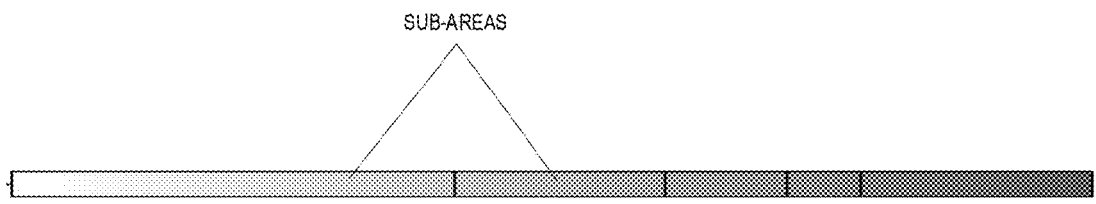
a
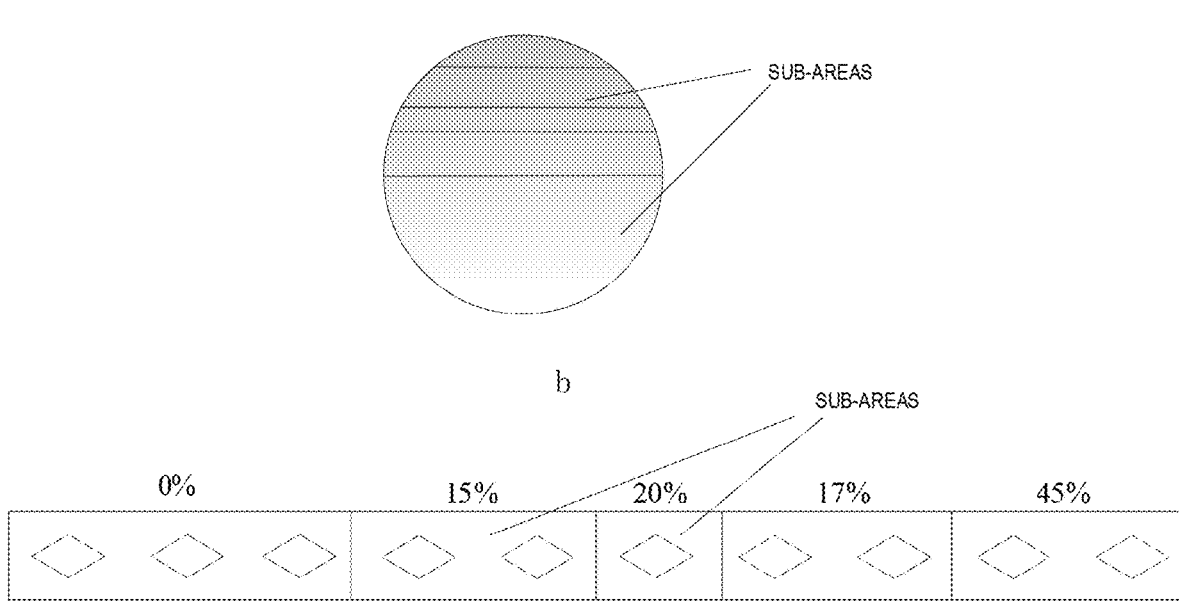
SUB-AREAS
b
SUB-AREAS
0%          15%       20%     17%        45%
c
FIG. 2

METHOD, APPARATUS, COMPUTER DEVICE AND STORAGE MEDIUM FOR INTERACTION CONTROL

FIELD

The present disclosure relates to the field of computer application technology, specifically to an interaction control method, device, computer device, and storage medium.

BACKGROUND

At present, many scenarios involve frequent interaction between users and virtual objects in virtual scenes. For example, in games, users need to control controls to trigger virtual objects to release different skills. When triggering skill release, the effect of the skills is usually fixed, and the interactivity is poor.

SUMMARY

Embodiments of the present disclosure at least provide a method, apparatus, computer device and storage medium for interaction control.

In a first aspect, embodiments of the present disclosure provide a method for interaction control comprising:

displaying, in a display interface of a terminal device, a virtual scene, a first skill control, a second skill control and an information indication component, the virtual scene comprising a target virtual object, the information indication component associated with a target value and a plurality of value intervals;

in response to a trigger operation for the first skill control, determining skill effect information of a first target skill corresponding to the first skill control based on the target value interval corresponding to the target value, and controlling the target virtual object to release the first target skill based on the skill effect information; and updating the target value;

in response to a trigger operation for the second skill control, controlling the target value to enter a locked state, wherein the target value remains unchanged for a predetermined time in the locked state.

In a possible embodiment, the information indication component comprises a component body, and displaying the information indication component comprises:

displaying the component body, and determining a target rendering mode for the component body based on the target value, the target rendering mode used to indicate the target value; and rendering the component body in accordance with the target rendering mode.

In a possible embodiment, the component body comprises sub-areas respectively corresponding to the plurality of value intervals, and rendering the component body in accordance with the target rendering mode comprises:

determining a target rendering region corresponding to the target value, the target rendering region comprising a first sub-area and/or at least a portion of a second sub-area, wherein the first sub-area comprises a sub-area corresponding to another value interval with values smaller than the target value interval, the second sub-area comprises a sub-area corresponding to the target value interval; and determining a target rendering effect and rendering the target rendering region.

In a possible embodiment, the first target skill corresponding to the first skill control is associated with first change information, and updating the target value comprises:

determining target change information of the target value based on the first change information associated with the first target skill; and updating the target value based on the target change information.

In a possible embodiment, the value interval corresponding to the target value is associated with second change information, and determining the target change information of the target value based on the first change information associated with the first target skill comprises:

determining the target change information of the target value based on the first and second change information.

In a possible embodiment, the plurality of value intervals is respectively associated with adjustment information, and determining skill effect information of a first target skill corresponding to the first skill control based on the target value interval corresponding to the target value comprises:

determining, based on the target value interval corresponding to the target value, target adjustment information associated with the target value interval; and determining the skill effect information of the first target skill corresponding to the first skill control based on the target adjustment information.

In a possible embodiment, the target adjustment information comprises gain information for an original skill effect of the first target skill, and determining the skill effect information of the first target skill corresponding to the first skill control based on the target adjustment information comprises:

determining the skill effect information of the first target skill based on the gain information for the original skill effect of the first target skill and the original skill effect of the first target skill.

In a possible embodiment, the target adjustment information further comprises state reduction information for the target virtual object.

The method further comprises: updating a real-time state of the target virtual object based on the state reduction information for the target virtual object.

In a possible embodiment, the plurality of value intervals comprises a first value interval.

The method further comprises: in response to a time length when the target value falls into the first value interval being greater than a first predefined time length, controlling the target value to be updated to a predefined value, and/or, updating a real-time state of the target virtual object.

In a possible embodiment, the method further comprises:

in response to the target value remaining unchanged in a second predefined time, controlling the target value to increase or decrease at a predetermined rate.

In a possible embodiment:

a regular attack control is displayed on the display interface, the regular attack control is associated with a plurality of attack types, the plurality of value intervals comprises a second value interval.

The method further comprises: in case that the target value falls into the second value interval, in response to a trigger operation for the first skill control, changing an attack type associated with the regular attack control based on a skill type corresponding to the first skill control;

in response to a trigger operation for the regular attack control with the attack type changed, controlling the target virtual object to release an attack corresponding to the attack type.

In a possible embodiment, the method further comprises in response to a trigger operation for the regular attack control with the attack type changed, controlling the attack type associated with the regular attack control to restore to an initial state.

In a possible embodiment, the method further comprises:

in response to the target value changes to fall into another value interval outside the second value interval, controlling the attack type associated with the regular attack control to restore to the initial state.

In the second aspect, embodiments of the present disclosure further provide an apparatus for interaction control comprising:

a display module for displaying, in a display interface of a terminal device, a virtual scene, a first skill control, a second skill control and information indication components, the virtual scene comprising a target virtual object, the information indication component associated with a target value and a plurality of value intervals;

a first response module for, in response to a trigger operation for the first skill control, determining skill effect information of a first target skill corresponding to the first skill control based on the target value interval corresponding to the target value, and controlling the target virtual object to release the first target skill based on the skill effect information; and updating the target value; and a second response module for, in response to a trigger operation for the second skill control, controlling the target value to enter a locked state, wherein the target value remains unchanged for a predetermined time in the locked state.

In a possible embodiment, the information indication component comprises a component body, and the display module, when displaying the information indication component, is configured for:

displaying the component body, and determining a target rendering mode for the component body based on the target value, the target rendering mode used to indicate the target value; and rendering the component body in accordance with the target rendering mode.

In a possible embodiment, the component body comprises sub-areas respectively corresponding to a plurality of value intervals, and the display module is configured for:

determining a target rendering region corresponding to the target value, the target rendering region comprising a first sub-area and/or at least a portion of a second sub-area, wherein the first sub-area comprising a sub-area corresponding to another value interval with values smaller than the target value interval, the second sub-area comprising a sub-area corresponding to the target value interval; and determining a target rendering effect and rendering the target rendering region.

In a possible embodiment, the first target skill corresponding to the first skill control is associated with first change information.

The first response module, when updating the target value, is configured for:

determining the target change information of the target value based on the first change information associated with the first target skill; and updating the target value based on the target change information.

In a possible embodiment, the value interval corresponding to the target value is associated with second change information, and the first response module, when determining the target change information of the target value based on the first change information associated with the first target skill, is configured for determining the target change information of the target value based on the first and second change information.

In a possible embodiment, the plurality of value intervals is respectively associated with adjustment information.

The first response module, when determining skill effect information of a first target skill corresponding to the first skill control based on the target value interval corresponding to the target value, is configured for:

determining, based on the target value interval corresponding to the target value, target adjustment information associated with the target value interval; and determining the skill effect information of the first target skill corresponding to the first skill control based on the target adjustment information.

In a possible embodiment, the target adjustment information comprises gain information for an original skill effect of the first target skill, The first response module, when determining the skill effect information of the first target skill corresponding to the first skill control based on the target adjustment information, is configured for:

determining the skill effect information of the first target skill based on the gain information for the original skill effect of the first target skill and the original skill effect of the first target skill.

In a possible embodiment, the target adjustment information further comprises state reduction information for the target virtual object.

The first response module is further configured for updating a real-time state of the target virtual object based on the state reduction information for the target virtual object.

In a possible embodiment, the plurality of value intervals comprises a first value interval.

The first response module is further configured for, in response to a time length when the target value falls into the first value interval being greater than a first predefined time length, controlling the target value to be updated to a predefined value, and/or updating a real-time state of the target virtual object.

In a possible embodiment, the first response module is further configured for:

in response to the target value remaining unchanged in a second predefined time, controlling the target value to increase or decrease at a predetermined rate.

In a possible embodiment, the display module is further configured for displaying a regular attack control on the display interface, the regular attack control is associated with a plurality of attack types, the plurality of value intervals comprises a second value interval.

The first response module is further configured for, in case that the target value falls into the second value interval, in response to a trigger operation for the first skill control, changing an attack type associated with the regular attack control based on a skill type corresponding to the first skill control;

in response to a trigger operation for the regular attack control with the attack type changed, controlling the target virtual object to release an attack corresponding to the attack type.

In a possible embodiment, the first response module is further configured for, in response to a trigger operation for the regular attack control with the attack type changed, controlling the attack type associated with the regular attack control to restore to an initial state.

In a possible embodiment, the first response module is further configured for:

in response to the target value changes to fall into another value interval outside the second value interval, controlling the attack type associated with the regular attack control to restore to the initial state.

In a third aspect, alternative embodiments of the present disclosure further provide a computer device comprising a processor and a memory, wherein the memory stores machine-readable instructions executable by the processor. The processor is used to execute machine-readable instructions stored in the memory, and the machine-readable instructions, when executed by the processor, carry out steps of the above first aspect or any possible embodiments of the first aspect.

In a third aspect, alternative embodiments of the present disclosure further provide a computer-readable storage medium storing a computer program thereon. The computer program carries out steps of the above first aspect or any possible embodiments of the first aspect.

The method interaction control provided in embodiments of the present disclosure displays a virtual scene, first skill control, second skill control, and information indication component in the display interface of the terminal device. The information indication component is associated with a target value and a plurality of value intervals. When the first skill control is triggered, the skill effect information of the first target skill corresponding to the first control is determined based on the target value interval corresponding to the target value, the target virtual object is controlled to release the first target skill based on the function information of this skill, and the target value is updated. When the second skill control is triggered, the target value is controlled to enter into a locked state. In this locked state, the target value will remain unchanged for a predefined time, and users can control the first target value to obtain different skill release results, with stronger interactivity.

It should be understood that the general description above and the detailed description in the following text are only illustrative and explanatory, and not limiting the technical solution disclosed in this disclosure.

In order to make the above objectives, features, and advantages of this disclosure more apparent and understandable, the following text provides preferred embodiments, and in conjunction with the accompanying drawings, provides a detailed explanation as follows.

BRIEF DESCRIPTION OF THE DRAWINGS

In order to provide a clearer explanation of the technical solution of the embodiments of the present disclosure, a brief introduction will be given to the accompanying drawings used in the embodiments. The accompanying drawings are incorporated into the specification and form a part of the specification. These drawings illustrate embodiments that comply with the present disclosure and are used together with the specification to illustrate the technical solution of the present disclosure. It should be understood that the following drawings only illustrate certain embodiments of the present disclosure, and therefore should not be regarded as limiting the scope. For the ordinary skilled in the art, other relevant drawings may also be obtained based on these drawings without creative labor.

FIG. 1 shows a flowchart of a method of interaction control provided by some embodiments of the present disclosure;

FIG. 2 shows an examples of information indication components provided by some embodiments of the present disclosure;

DETAILED DESCRIPTION

Figure 3A:
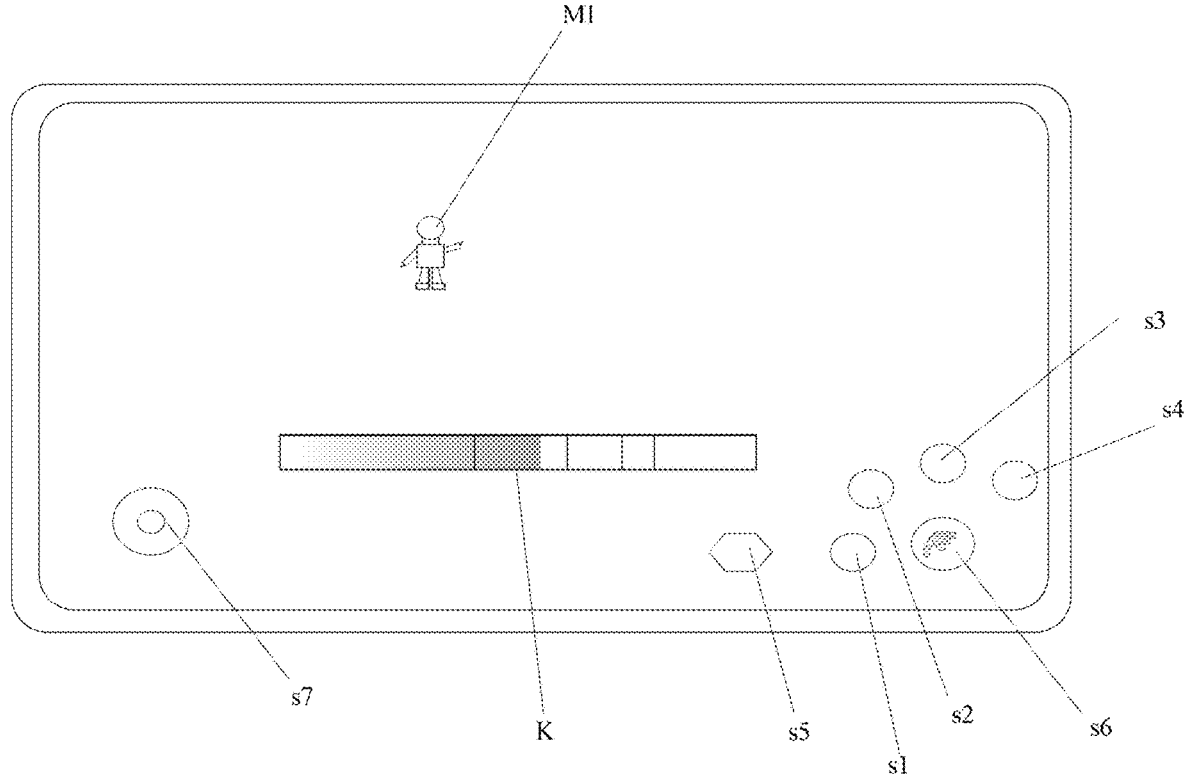
FIG. 3*a* shows an example of displayed content in the display interface provided by some embodiments of the present disclosure.

In order to make the purpose, technical solution, and advantages of the embodiments of the present disclosure clearer, the following will provide a clear and complete description of the technical solution in embodiments of the present disclosures in conjunction with the accompanying drawings. Obviously, the described embodiments are only a part of the embodiments of the present disclosure, but not all of them. The components of the embodiments of the present disclosure described and shown herein may typically be arranged and designed in various different configurations. Therefore, the following detailed description of the embodiments of the present disclosure is not intended to limit the scope of the claimed protection, but only to represent the selected embodiments of the present disclosure. Based on the embodiments of the present disclosure, all other embodiments obtained by those skilled in the art without creative labor fall within the scope of protection of the present disclosure.

Through research, the inventors found that in the current game scenario, skill controls will be displayed in the display interface of the terminal device. The user controls the virtual objects in the game to release corresponding skills by triggering the skill control. The release effect of a skill is usually determined based on the attributes of the skill (such as the original damage effect of the skill), the attributes of the virtual object (such as the attack and critical strike attribute values of the virtual object), and the related attributes of the skill release object (such as the defense and critical strike attribute values of the skill release object). That is, for the same skill release object, the virtual object releases a certain skill to attack it. The attack effect is usually relatively fixed. As a result, users are unable to control the skill release effect independently, leading to poor interactivity issues.

Based on the above research, embodiments of the present disclosure provide an interaction control mechanism that can enhance the user's control over the specific skill release effect and enhance interactivity during skill release.

The shortcomings of the above solutions are all the results of the inventors' practice and careful study. Therefore, the discovery process of the above problems and the solutions proposed by the present disclosure in the following text should all be the contributions made by the inventor to the present disclosure process.

It should be noted that similar labels and letters represent similar terms in the following figures, so once an item is defined in a figure, further definition and explanation are not required in subsequent figures.

To facilitate the understanding of the disclosed technical solution, the technical terms in embodiments of the present disclosures are first explained:

Virtual scenes, such as virtual 3D scenes implemented through computer technology; In this virtual 3D scene, a plurality of virtual objects are included; A plurality of virtual objects may include virtual objects that users may control or virtual objects that users cannot control; Virtual objects that cannot be controlled by users, such as buildings, vegetation, mountains, rivers, and other virtual objects that constitute the environment in virtual scenes, may also be virtual objects that users can interact with.

The interaction control mechanism as described herein may be applied to any game scenario that involves interaction control of virtual objects. For example, it may include third-person pronoun shooting games, first person shooting games, role playing games, action games, strategy games, combat games, sports games, adventure games, etc. At this point, in the case where the extracted virtual scene in embodiments of the present disclosure is a game virtual scene, the virtual objects that users can interact with include, for example, non player characters (NPCs) used to pick up tasks in the game, "monsters" that can be attacked, and so on. Virtual objects may include, but are not limited to, at least one of virtual characters and virtual animals, virtual objects that can be controlled by users, and non user roles set according to the needs of the game. Scope of the present disclosure is not limited in this regard.

The display interface of the terminal device displays at least some virtual scenes. In the display interface of the terminal device, there are also a plurality of controls that can be touched by the user. The user controls the virtual object to perform corresponding operations through touch controls. For example, when the game includes role-playing games, the game operation interface may include various types of controls, such as, item usage controls, movement controls (such as joystick), actions (such as, aiming, jumping, squatting, crawling, etc.), and skill release controls. It may also be other types of controls, which can be set according to actual game needs.

In embodiments of the present disclosure, the controls that can be touched by the user comprise a first skill control and a second skill control. The specific descriptions of the first and second skill controls can be found in the following description and will not be detailed here.

To facilitate the understanding the embodiments, a detailed introduction is first given to an interaction control method disclosed in the embodiments of the present disclosure. The executing entity of the interaction control method provided in the embodiments of the present disclosure is generally a computer device with a certain computing capability, which includes, for example, a terminal device, a server, or other processing device. The terminal device may be User Equipment (UE), mobile device, user terminal, terminal, cellular phone, cordless telephone, personal digital assistant (PDA), handheld device, computing device, on-board device, wearable device, etc. In some possible implementations, the interaction control method may be implemented by a processor calling computer-readable instructions stored in a memory.

Detailed description of the interaction control method provided by the embodiments of the present disclosure will be given below.

Referring to FIG. 1, which shows a flowchart of a method of interaction control provided by embodiments of the present disclosure, the method comprises steps S101 to S103, where:

S101: display, in a display interface of a terminal device, a virtual scene, a first skill control, a second skill control and information indication components, the virtual scene comprising a target virtual object, the information indication component associated with a target value and a plurality of value intervals;

S102: in response to a trigger operation for the first skill control, determine skill effect information of a first target skill corresponding to the first skill control based on the target value interval corresponding to the target value, and control the target virtual object to release the first target skill based on the skill effect information; and update the target value;

S103: in response to a trigger operation for the second skill control, control the target value to enter a locked state, wherein the target value remains unchanged for a predetermined time in the locked state.

The embodiments of the present disclosure display an information indication component in a display interface, which is associated with a target value and a plurality of value intervals. When the first target skill is triggered through the first skill control, the skill effect information of the first target skill is determined by the target value interval corresponding to the target value, and based on this skill effect information, the target virtual object is controlled to release the first target skill, and the target value is updated. The target value may also be controlled to enter a locked state through the second skill control. In this locked state, the target value remains unchanged, thereby ensuring that the skill effect information corresponding to the first target skill does not change when the target value enters the locked state. In this way, users can control the target value to belong to different value intervals through the second skill control and the first skill control, thereby achieving the ability to independently control the skill effect information of the same target skill, enhancing the user's control over the skill effect information during the skill release process, and enhancing the interactivity during the skill release process.

Detailed descriptions of S101 to S103 as mentioned above will be provided below.

For S101, there may be one or more first skill controls displayed in the terminal device. In the case of a plurality of first skill controls, a plurality of first skill controls may control different first skills separately. If any of the plurality of first skill controls is triggered, the first skill corresponding to the first skill control is considered as the first target skill, and the skill effect information of the first target skill is determined by use of the interaction control method provided in embodiments of the present disclosure.

In a possible embodiment, the first skill control comprises, for example, a skill release control. If the skill release control is triggered, it will cause an increase or decrease in the target value.

In another possible implementation, the first skill control comprises, for example, a skill release control and an action control. The skill release control will cause an increase in the target value. The triggering of the action control will cause a decrease in the target value.

In another possible implementation, if the target value does not change within the second predefined time, the target value is controlled to increase or decrease at a predetermined rate.

The second skill control is used to control the target value to enter a locked state. In the locked state, the target value remains unchanged for the predefined time, that is, it will not update with the first skill control being triggered.

The information indication component is associated with a target value and a plurality of value intervals.

The information indication component comprises, for example, the component body. The shape of the main body of this component may be set according to actual game needs, such as bar, circular, a plurality of indicator lights, etc.

The target value associated with the information indication component, such as the amount of virtual resources that will be released by the first skill, such as the energy value accumulated after the virtual object of the warrior profession releases the skill, the heat value generated after the virtual object of the gunner profession releases the hot weapon skill, etc., may be set according to the actual game requirements. The corresponding total value interval for the virtual resource may be set in advance, and the total value interval may be divided into a plurality of value intervals which will be associated with the information indication component. In addition, in order to more clearly indicate the value interval of the target value, the component body may also be divided into sub-areas corresponding to the plurality of value intervals.

As shown by "a" in FIG. 2, a component body of a bar is presented. The component body of the bar is divided into 5 sub-areas, indicating 5 different value intervals respectively. As shown by "b" in FIG. 2, a circular component body is presented, which is divided into 5 sub-areas corresponding to 5 different value sub-intervals respectively. As shown by "c" in FIG. 2, a component body of a multi-indicator lights process, where there are 10 indicator lights, which are divided into 5 groups, namely, 5 sub-areas, and the 5 groups of indicator lights correspond to 5 value intervals respectively.

The size of a sub-area occupied by each value interval on the component body may be determined based on a proportion of each value interval in the total value interval.

In displaying information indication components, for example, the following ways may be used:

Displaying the component body, and determining the target rendering mode for the component body based on the target value; the target rendering mode is used to indicate the target value;

Rendering the component body according to the target rendering mode.

In determining the target rendering mode, for example, a target rendering region corresponding to the target value may be determined, and the target rendering region includes a first sub-area and/or at least a portion of a second sub-area. The first sub-area comprises sub-areas corresponding to other value intervals with values smaller than the target value interval. The second sub-area comprises a sub-area corresponding to the target value interval; the target rendering effect is determined, and the target rendering region is rendered.

In determining the target rendering region corresponding to the target value, for example, the value interval to which the target value belongs may be determined as the second sub-area as mentioned above. At this point, if the target value does not reach the upper limit of the value interval corresponding to the second sub-area, the determined target rendering region only includes the part of the second sub-area. If the target value reaches the upper limit of the value interval of the second sub-area, the target rendering region includes the complete second sub-area. In addition, if there is a certain value interval that is smaller than the value interval to which the target value belongs, the corresponding sub-area of the value interval is determined as the first sub-area.

At this point, if the current value of the target value is the minimum value of the total value interval, neither the first nor second sub-areas exist.

In addition, the target rendering effect corresponding to the current value may be determined based on the predefined rendering method, and then the determined target rendering effect may be used to render the target rendering region.

In particular implementations, the rendering approach corresponding to the component body is designed in advance; taking the component body shown by "a" in FIG. 2 as an example, the rendering approach for the component body in the shape of bar is, for example, to render in the form of a progress bar that is able to indicate the target value.

For example, the total value interval of the target value is [0, 100]. When the target value is 0, the component body is empty, that is, no progress bar color is displayed. The rendering color corresponding to the component body is the color of the component body itself. With the increase of the target value, the length of the progress bar will grow in the main body of the component in proportion to the maximum value of the target value in the total value interval, and the color will change as well. For example, with the increase of the target value, the color depth of the progress bar will change, such as gradually deepening, changing from light red to dark red, or changing the color hue, such as changing from green to red.

As another example, taking the component body shown by "c" in FIG. 2 as an example, the rendering approach of the component body composed of a plurality of indicator lights is performed, for example, by the way that the indicator lights are lit.

By way of example, when the total value interval of the target value is [0, 100], and the target value is 0, the component body is empty, that is, all indicator lights are not lit. As the target value increases, the number of illuminated indicator lights gradually increases in proportion to the maximum value of the target value occupying the total value interval, and the color may also change accordingly. For example, as the target value increases, the color of the indicator lights gradually deepens, such as from light red to deep red, or there is a change in color tone, such as from green to red.

In FIG. 2, "a" shows the progress bar in the direction from the minimum value to the maximum value of the total value interval, and the color changes from light to dark.

For S102 as mentioned above, the trigger operation for the first skill control may comprise clicking, sliding, a plurality of combos, and pressing again on the first skill control. After the first skill control is triggered, in response to the trigger operation for the first skill control, the skill effect information for the first target skill corresponding to the first skill control is determined based on the target value interval corresponding to the target value at the time of triggering the operation.

In some embodiments, the plurality of value intervals are associated with adjustment information. The adjustment information associated with any value interval A is used to indicate the adjustment content of the skill effect of the first skill B after releasing the first skill B when the target value belongs to that value interval A.

In determining the skill effect information of the first target skill corresponding to the first skill control based on the target value interval corresponding to the target value, for example, it may comprise:

determining target adjustment information associated with the target value interval based on the target value corresponding to the target value interval; determining the skill effect information of the first target skill corresponding to the first skill control based on the target adjustment information.

adjusting information, for example, it may comprise gain information of the original skill effect on the first target skill. The gain information is for example the gain on the original value of the original skill effect, or an addition of a new skill effect on top of the original skill effect.

For example, the original damage value or original gain value corresponding to the first skill B may be adjusted, or new special skill effects added to the first skill.

By way of example, in case that the first skill B is an attack skill against the virtual object M1 belonging to a different game faction, the adjustment information is used to indicate that the attack value of the first skill B against the virtual object M1 is increased by a first predefined value. The first predefined value may be set according to actual requirements, such as, increasing by 0%, 15%, 30%, 50%, etc.

For another example, in case that the first skill B is a gain skill for the virtual object M2 belonging to the same game faction, the adjustment information is used to indicate that the gain value of the first skill B to the virtual object M2 is increased by a second predefined value. The second predefined value may also be set according to actual requirements, such as, increasing by 0%, 10%, 15%, 20%, etc.

For still another example, in case that the first skill B is an attack skill against the virtual object M1 belonging to a different game faction, the adjustment information is used to indicate that special skill effects, such as, freezing, dizziness, burning, etc. are added to the attack of the first skill B against the virtual object M1, and for different skill effects, different negative states will be added to the virtual object M1.

For yet another example, in case that the first skill B is a gain skill for the virtual object M2 belonging to the same game faction, the adjustment information is used to indicate that special skill effects are added to the virtual object M2 by the first skill B, such as, temporary acceleration, immune control, etc. For different skill effects, different positive states will be added to the virtual object M2.

In addition, the adjustment information may also be in other forms, which will not be repeated herein.

The adjustment information associated with the plurality of value intervals may be entirely different or partially the same.

In the example shown in FIG. 2 "a", there are 5 value intervals, each of which has the same adjustment information associated therewith. The adjustment value for the skill damage of the first skill in the first value interval is increased by 0%; the adjustment value of the second value interval for the skill damage of the first skill is increased by 15%; the adjustment value of the third value interval for the skill damage of the first skill is increased by 25%; the fourth value interval increases the skill damage of the first skill by up to 15%; and the adjustment value of the fifth value interval for the skill damage of the first skill is increased by 40%.

The adjustment information associated with each value interval may be displayed in the information indicator component or may not be displayed but explained on another page. If the user triggers the display on this page, it will be displayed to the user. In addition, it is possible not to display specific adjustment information to users through the information indication component, but to display the adjustment information corresponding to each value interval only if the user triggers the information indication component, such as clicking on the information indication component.

In the example shown in FIG. 2 "a", the adjustment information associated with each value interval is not displayed separately. In the example shown in FIG. 2 "c", the adjustment information associated with each value interval is displayed through the information indication component. The adjustment information corresponding to the 5 value intervals is 0%, 15%, 20%, 17%, and 45%, respectively.

For example, in determining the skill effect information of the first target skill, it is possible to determine the skill effect information of the first target skill based on the gain information of the original skill effect of the first target skill and the original skill effect of the first target skill.

As an example, the original skill effect of the first target skill indicates that the damage value of virtual object M1 from different factions is 1350. If the target adjustment information comprises adding 15% to the damage value, the determined skill effect information corresponding to the first target skill will be 1350*1.15=1552.5. If the target adjustment information comprises causing a 2-second freezing effect on virtual object M1, the determined skill effect information corresponding to the first target skill will cause 1350 damage to virtual object M1 and cause a 2-second freezing effect on virtual object M1.

Upon determining the skill effect information of the first target skill, based on this skill effect information, the target virtual object may be controlled to release the first target skill.

In another embodiment, in response to the trigger operation for the first skill control, the target value may also be updated. The impacts of different first skill controls on the target value may be the same or different. The impacts may cause the target value to be increased, or alternatively, cause the target value to be reduced.

Consider the heat value generated by a virtual object with a target value as the gunner profession after releasing a hot weapon skill as an example. The first skill control s1 corresponds to a heavy artillery attack, which can generate a larger heat value, that is, releasing the first skill corresponding to s1 may increase the target value by a larger value. The first skill control s2 corresponds to a regular firearm attack, which can generate a smaller heat value. That is, after releasing the first skill corresponding to s2, the target value may be caused to be increased by a smaller value. The first skill control s3 corresponds to a cooling ray attack, which can cool down the heat value to a certain degree. That is, after releasing the first skill corresponding to s3, the target value is caused to be reduced by a certain value.

In addition, in case that the target value is in different value intervals, the impacts of the same skill control on the target value may be the same or different.

If the target value is in different value intervals, the same skill control has the same degree of impact on the target value:

Taking the target value being the heat value as an example, there are 5 value intervals for the target value, ranging from u1 to u5. For the first skill control s1, when the target value belongs to different value intervals, the impacts on the target value are the same; for the first skill control s1, the first skill control s2, and the first skill control s3, when the target value belongs to the same value interval, the impacts of the first skill control s1 and the first skill control s2 on the target value are the same. For example, triggering the first skill control s1 or triggering the first skill control s2 will increase the target value by 5 regardless of which of the value intervals u1 to u5 the target value currently belongs to; while triggering the first skill control s3 will increase the target value by 10 regardless of which of the value intervals u1 to u5 the target value currently belongs to.

To this end, in an embodiment of the present disclosure, the first target skill corresponding to the first skill control may be associated with the first change information.

Updating the target value comprises:

determining the target change information of the target value based on the first change information associated with the first target skill; and updating the target value based on the target change information.

At this point, in case that the first change information is set as a growth value, the growth value may be directly determined as the target change information. In addition, the first change information may also be determined as the growth rate, and the product of the growth rate and the maximum value of the value interval may be determined as the target change information. In some embodiments, other determination methods may also be used, which will not be listed here.

If the target value is in different value intervals, the same skill control has different degrees of impact on the target value:

Taking the target value as the heat value as an example, there are 5 value intervals for the target value, and the corresponding adjustment information is: 0%, 15%, 20%, 15%, 40%. In case that the target value belongs to the fifth value interval and lasts for a certain period of time, a certain negative state may be caused for the target virtual character. For the same first skill control s1, the degree of impact on the target value may vary in case that the target value belongs to different value intervals.

For example, in case that the target value belongs to the first value interval, in order to quickly accumulate the heat value and achieve a gain on the release of the first skill as soon as possible, after triggering the first skill control s1, the target value may be increased by a larger value.

In case that the target value belongs to the second value interval, the accumulation speed of the target value may be slowed down. After triggering the first skill control s1, the target value may be increased by a smaller value.

In case that the target value belongs to the third value interval, as it has a significant impact on the gain of the first skill and does not cause a negative state to the target virtual object, the accumulation speed of the target value may be further slowed down, so that the target value may stay in the third value interval for a longer time. Therefore, after triggering the first skill control s1, the target value may be increased by a smaller value and an increased value, The value added when the target value belongs to the second value interval.

In case that the target value belongs to the fourth value interval, the accumulation speed of the target value may be the same as when the target value belongs to the first value interval.

In case that the target value belongs to the fifth value interval, due to the maximum impact on the gain of the first skill at this time, a negative state may be caused to the target virtual object. At this time, the accumulation speed of the target value may be increased. After triggering the first skill control s1, the target value may be increased by a larger value.

The above example is only an example of controlling the accumulation of target values through the first skill, without suggesting any limitations as to the interaction control method provided in embodiments of the present disclosure. The update method of target values may be determined based on actual game needs.

In this case, in order to update the target value, the second change information may be associated with the plurality of value intervals, and the first change information may be associated with the first target skill corresponding to the first skill control. In updating the target value, the target change information of the target value may be determined based on the second change information associated with the value interval corresponding to the target value as well as the first change information associated with the first target skill, and the target value may be updated based on the target change information.

The second change information may include the growth rate of the target value; and the first change information may include the increase in target value after releasing the first target skill, for example. In determining the target change information of the target value based on the second and first change information, the above growth rate and growth value may be multiplied to obtain the target change information, for example.

In addition, both the second and first change information may be set as growth values. In determining the target change information of the target value based on the second and first change information, for example, the growth values indicated by the second change information and the first change information may be added together.

The above growth rate and growth value may be positive or negative. By varying the growth rate and growth value, the target value may be controlled to increase or decrease, the rate of increase, and the rate of decrease. In addition, other methods may also be used to determine the target change information, and then the target value may be updated using the target change information. Scope of the present disclosure is not limited in this regard.

In another embodiment of the present disclosure, if the target value is within a specific value interval, it may also increase the reduction state for the target virtual object itself. In this case, the target adjustment information also includes information on the state reduction benefits of the target virtual object.

At this point, if the target value belongs to a specific value interval, the real-time state of the target virtual object may be updated based on the state reduction information of the target virtual object.

The reduced benefit state includes a burning state, for example. In this burning state, the health of the target virtual object decreases by a certain amount at regular intervals. As the duration of the burning state increases, the target virtual object's reduced health at regular intervals may also continue to increase.

In addition, the benefit reduction state may also be other types of benefit reduction states, such as, delay, reduced skill hit, and reduced effective range of skills. In a slow state, the movement speed of the target virtual object decreases. When the skill hit rate decreases, the hit rate of the target virtual object's regular attack (non-skill attack) decreases. When the target virtual object releases a skill in a state where the effective range of the skill decreases, the effective range of the skill decreases by a certain percentage. Specifically, the specific content of the reduction status may be determined based on the specific requirements of the game.

In another embodiment of the present disclosure, the plurality of value intervals includes a first value interval. In response to the time when the target value falls into the first value interval being greater than the first predefined time, the target value is controlled to be updated to the predefined value, and/or the real-time state of the target virtual object is updated.

For example, taking the target value as the heat value, the total value interval of the target value is [0, 100]. There are 5 value intervals for the target value, and the corresponding adjustment information is 0%, 15%, 20%, 15%, and 40%. In case that the target value belongs to the fifth value interval and lasts for a certain period of time, it will cause a certain negative state for the target virtual character. At the same time, the fifth value interval will be used as the first value interval mentioned above. In case that the target value falls into the fifth value interval for a longer time than the predefined time, the target value will be updated to the minimum value of the total value interval, which is 0. At this time, the adjustment information will change from 40% to 0%. The user needs to accumulate target values again in order to achieve a state of adding bonus to the skill effect of the first skill.

In addition, the real-time state of the target virtual object may also be updated to a certain state, such as, death state, cooling state, or any other state. In a dead state, it is necessary to resurrect the target virtual object before continuing control. In a cooling state, the target virtual object cannot continue to release skills and may only engage in regular attacks or enter a state where it cannot move.

In this way, by setting the first value interval among a plurality of value intervals, players can control the target value independently, which increases the difficulty of operation during the game process and increases the fun of the game.

For S103 as mentioned above, the second skill control is used to control the target value to enter a locked state. There is a plurality of ways to use the second skill control. For example, the cooling duration may be set for the second skill control as well. After the second skill control is triggered, a cooling state is entered. In this cooling state, the second skill control cannot be triggered again. In case that the duration of the cooling state reaches the predefined cooling time, a triggerable state is entered. The user may control the target value to enter a locked state by triggering the second skill control again.

In addition, trigger conditions may also be set for the second skill control. The second skill control may be triggered again upon reaching the triggering conditions, such as the number of releases of regular skills reaching a certain number, and the number of kills against virtual objects of hostile factions reaching a predefined number. The specific settings may be set according to actual needs, and the scope of the present disclosure is not limited in this regard.

After the target value enters the locked state, the target value remains unchanged for the predefined time. In this locked state, the release of the first skill does not cause an update to the target value, and the target value will not naturally decrease or increase over time.

In addition, after the target value enters the locked state, the release control for unlocking the locked state may also be displayed in the display interface. In response to the trigger of the release control, the target value is controlled to exit the locked state. At this point, the locked state is no longer affected by the predefined time. For example, assuming that the predefined time is 10 seconds, when the target value enters the locked state for 5 seconds, the user unlocks the target value by releasing the control. When the first skill is triggered again, the target value updates with the triggering of the first skill control. This can further enhance the flexibility and interactivity in the process of releasing game skills.

In another embodiment of the present disclosure, a regular attack control is also displayed on the display interface, and the regular attack control is associated with a plurality of attack types. The plurality of value intervals comprises a second value interval.

The interaction control method provided by the embodiments of the present disclosure may further comprise: when the target value falls into the second value interval, in response to the trigger operation for the first skill control, changing an attack type associated with the regular attack control based on the skill type corresponding to the first skill control.

In response to the trigger operation for the regular attack control with the attack type changed, the target virtual object is controlled to release the attack corresponding to the attack type.

In some embodiments, a plurality of attack types is associated with regular attack controls, such as regular attack types and attack types related to different types of first skills.

For example, assume that there are three first skill controls for the target virtual object, namely, s1, s2, and s3. There are different types of corresponding first skills, comprising: s1: assault skills in the collision category; s2: bombing skill for releasing grenades; and s3: release laser skills. The attack types related to the above three first skills respectively comprise: assault skills corresponding to melee body skill attack skills, bombing skills corresponding to Howitzer shooting skills, and laser skills corresponding to launching plasma projectiles.

In the normal state, when the regular attack control is triggered, the target virtual object releases the regular attack skill.

If the value interval corresponding to the target value is a specific second value interval, after triggering the first skill control s1, the regular attack skill associated with the regular attack control is changed to release the melee physical attack skill. At this point, if the regular attack control is triggered, the target virtual object is controlled to release melee body art attack skills.

After triggering the first skill control s2, the regular attack skill associated with the regular attack control is changed to release the Howitzer shooting skill. At this time, if the regular attack control is triggered, the target virtual object is controlled to release the Howitzer shooting skill.

After triggering the first skill control s3, the regular attack skill associated with the regular attack control is changed to the skill of launching plasma bullets. At this point, if the regular attack control is triggered, the target virtual object is controlled to release and launch plasma pellets.

In another embodiment of the present disclosure, in response to the trigger operation for the regular attack control after the attack type is changed, the attack type associated with the regular attack control is controlled to restore to its initial state. That is, after triggering the regular attack control that has changed the attack type, the attack type associated with the regular attack control will be changed back to the regular attack.

Alternatively, it is possible to maintain the association between the skill type corresponding to the first skill control and the regular attack control for a period of time. Within the duration of this period, the regular attack control with the attack type changed may be triggered a plurality of times to release the changed attack type. For example, in the above example, after the first skill control s1 is triggered, the release Howitzer shooting skill associated with the regular attack control will remain for 5 seconds. In these 5 seconds, the user can trigger the regular attack control many times to release the Howitzer shooting skills for many times.

Alternatively, it is also possible to maintain the association between the skill type corresponding to the first skill control and the regular attack control for a certain duration. If the user does not trigger the regular attack control within this duration, the attack type associated with the regular attack control will automatically restore to its initial state after the duration ends. If the user triggers a regular attack control within this duration, there is no need to wait for the duration to terminate. After controlling the target virtual object to release the corresponding attack type, the attack type associated with the regular attack control is changed to the regular attack.

In another embodiment of the present disclosure, only if the target value falls into the second value interval, the attack type associated with the regular attack control be changed will be changed based on the skill type corresponding to the first skill control in response to the trigger operation for the first skill control. Therefore, when the target value changes to another value interval outside the second value interval, the attack type associated with the control regular attack control restore to its initial state. [01%] As shown in FIGS. 3a to 3d, the embodiments of the present disclosure provide an example of a display interface for a terminal device, in which there are four first skill controls s1 to s4, one second skill control s5, and a bar information indication component K. In addition, the display interface also displays the regular attack control s6. At this point, the attack type associated with the regular attack control is regular attack, and the button icon corresponding to the regular attack is displayed in the regular attack control. In the display interface, there is also a target virtual object M1 displayed. The maximum value interval of the target value associated with the information indication component is [0, 100] and is divided into 5 value intervals, corresponding to the 5 sub-areas on the component body. In addition, in the display interface, there is also a joystick control s7 used to control the movement of the target virtual object M1.

As shown in FIG. 3a, before any of the first skill controls s1 to s4 is triggered, the target value is in the second value interval. At this time, the corresponding rendering method is shown in FIG. 3a, where, for the target rendering mode determined by the information indication component, the first value interval and part of the second value interval are rendered according to the progress bar whose color ranges from light to thick. The other areas of the component body display the original color of the component body.

Figure 3B:
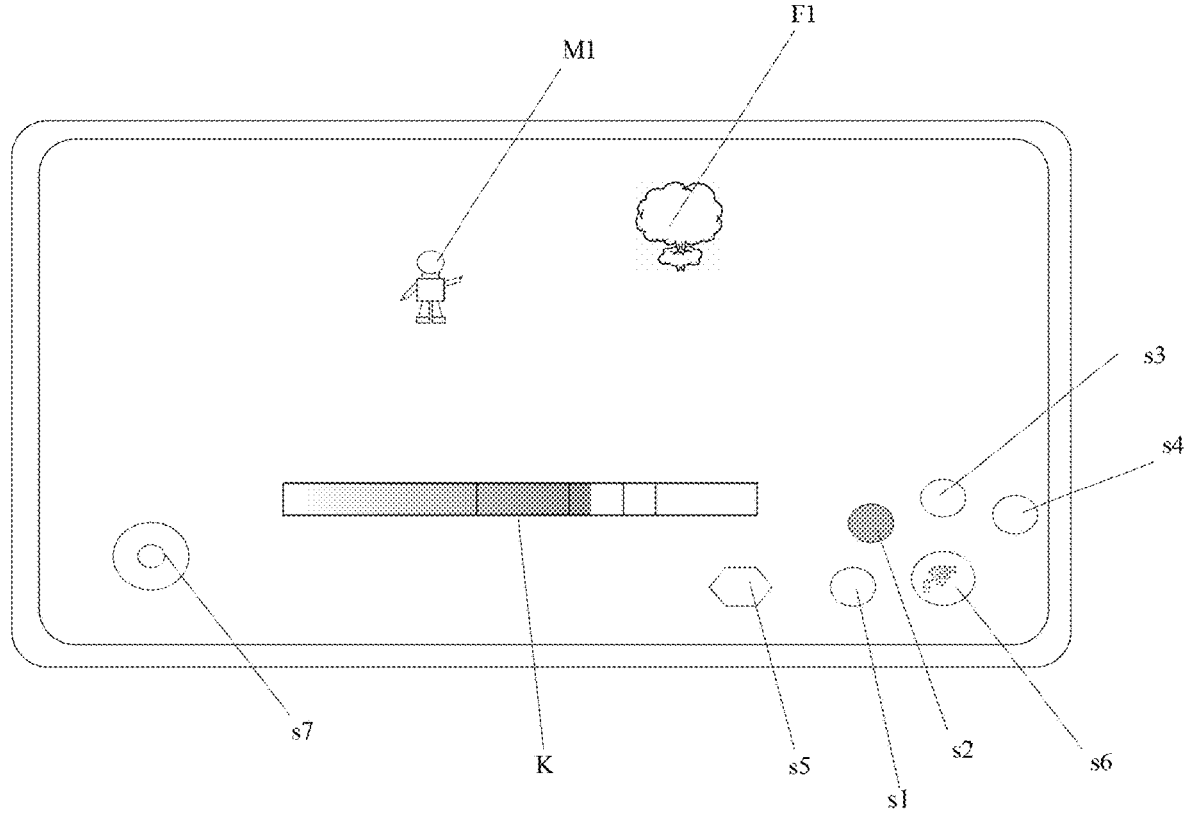
FIG. 3*b* shows example of displayed content in the display interface provided by some embodiments of the present disclosure.

As shown in FIG. 3b, after the first skill control s2 is triggered, the target virtual object M1 releases the first target skill corresponding to the first skill control s2. The skill effects of the first target skill corresponding to the first skill control s2 are shown in F1 in FIG. 3b. The target value is updated to enter the third value interval, and the corresponding rendering method is shown in FIG. 3b. The first value interval, the second value interval and some areas of the third value interval are rendered according to the progress bar from light to thick color. At this point, the first target skill corresponding to the first skill control s2 enters a cooling state, as shown in FIG. 3b in a gray non triggering state.

Figure 3C:
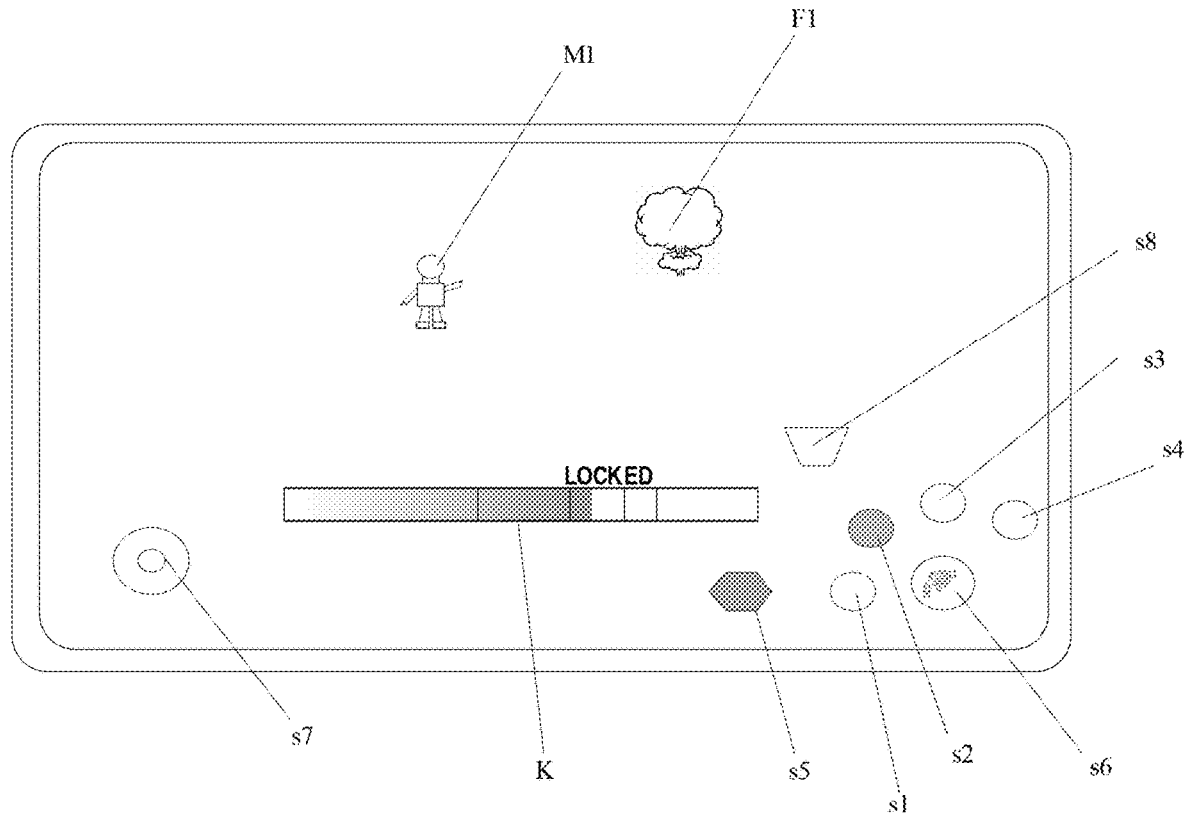
FIG. 3*c* shows an example of displayed content in the display interface provided by some embodiments of the present disclosure.

After the state in FIG. 3b, if the second skill control s5 is triggered, the target value enters the locked state. As shown in FIG. 3c, in this locked state, a flag for the locked state is added to the information indication component, which indicates that the current target value will not change within a certain period of time. In this example, the text "locked" is directly used as an identifier for the locked state. Other ways, such as, graphics, etc., may also be used for representing the locked state. At this point, a new release control s8 is added next to the information indication component K. At this point, if the release control s8 is triggered, the flag "locked" disappears, which indicates that the target value has exited the locked state and may change with the triggering of the first skill controls s1-s4. Moreover, the second skill control s5 enters a cooling state, as shown by the gray non triggering state in FIG. 3c.

Figure 3D:
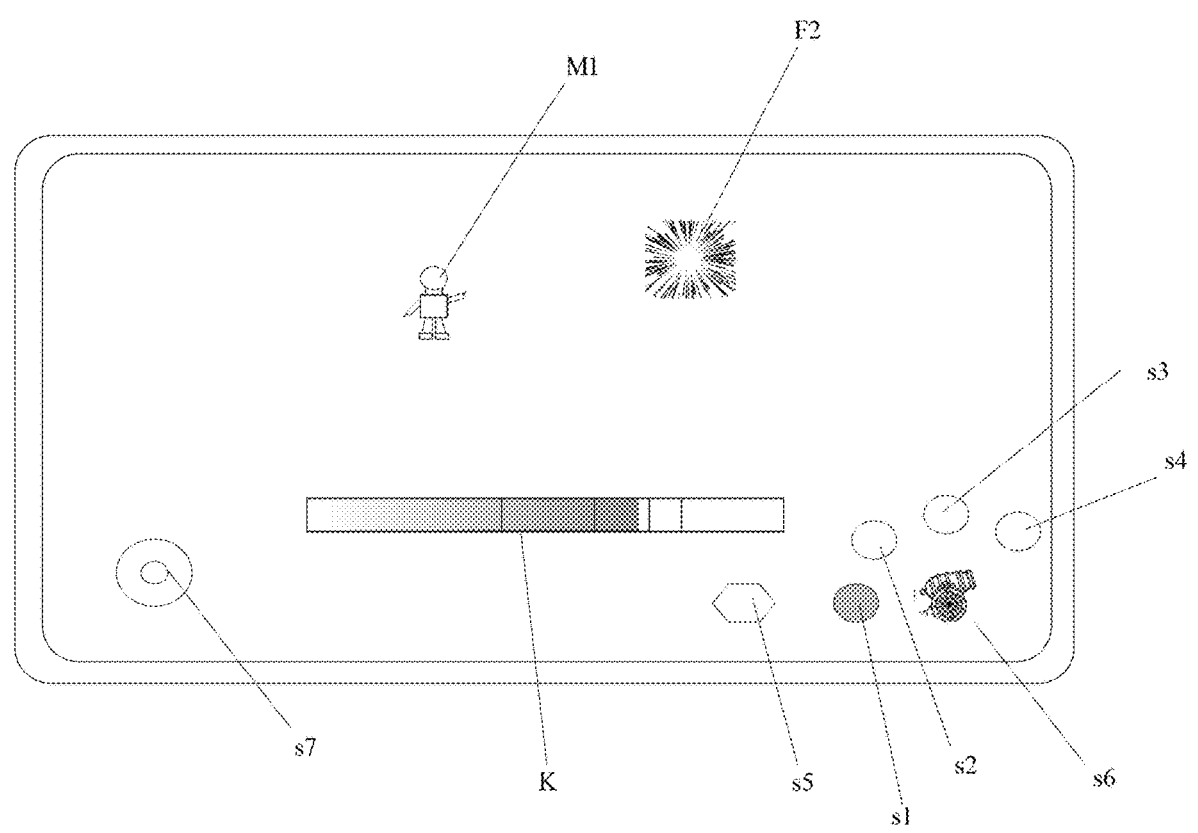
FIG. 3*d* illustrates an example of displayed content in the display interface provided by some embodiments of the present disclosure.

If the third value interval is the second value interval in embodiments of the present disclosure, and if the first skill corresponding to the first skill control s1 is released in the state of FIG. 3b, the skill effect of the first target skill corresponding to the first skill control s1 is shown by F2 in FIG. 3d. At the same time, the attack type associated with the regular attack control s6 is changed from the regular attack type to the skill type corresponding to the first skill control s1. At this point, the skill icon displayed in the regular attack control is changed from the skill icon of the regular attack to the skill icon corresponding to the skill type corresponding to the first skill control s1. The transformation of skill icons is shown as FIGS. 3b and 3d. FIG. 3b shows the corresponding skill icons in case that the regular attack control is associated with the regular attack; and FIG. 3d shows that the skill icon of the regular attack control is changed to the skill icon of the skill type corresponding to the first skill control s1 in case that the target value is in the third value interval (i.e., the second value interval). At this point, the first target skill corresponding to the first skill control s1 enters a cooling state, as shown by a gray non triggering state in FIG. 3d. The cooling state of the first skill control s2 terminates and restores to a releasable state. The target value indicated by the information indication component is updated again.

When each first skill control is triggered and the target value falls into the fifth value interval, the fifth value interval is the first value interval in embodiments of the present disclosure, and a reduction state is applied to the target virtual object M1 (not shown in the figures). If the target value falls into the fifth value interval for the first predefined time, the control target value is updated to 0. In addition, the real-time state of the target virtual object may also be updated to the predefined state at the same time.

Based on the same inventive concept, an interaction control device corresponding to the interaction control method is also provided in embodiments of the present disclosure. Since the principle of solving the problem in the device in embodiments of the present disclosure is similar to the interaction control method mentioned in embodiments of the present disclosure, the implementation of the apparatus may refer to the implementation of the method, and thus will not be repeated herein.

Figure 4:
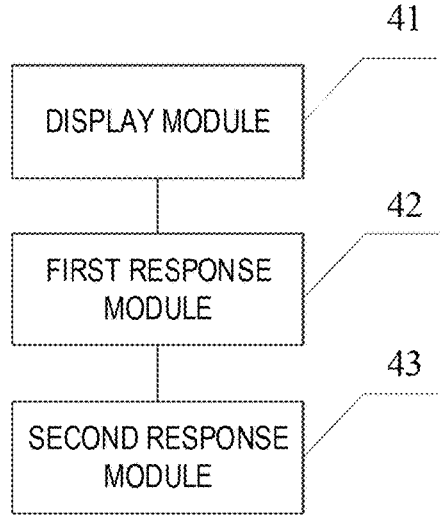
FIG. 4 shows a schematic diagram of an apparatus for interaction control provided by some embodiments of the present disclosure.

FIG. 4 shows a schematic diagram of an apparatus for interaction control as provided in embodiments of the present disclosure, where the apparatus comprises a display module 41, a first response module 42, and a second response module 43.

The display module 41 is configured for displaying, in a display interface of a terminal device, a virtual scene, a first skill control, a second skill control and information indication components, the virtual scene comprising a target virtual object, the information indication component associated with a target value and a plurality of value intervals.

The first response module 42 is configured for, in response to a trigger operation for the first skill control, determining skill effect information of a first target skill corresponding to the first skill control based on the target value interval corresponding to the target value, and controlling the target virtual object to release the first target skill based on the skill effect information; and updating the target value.

The second response module 43 is configured for, in response to a trigger operation for the second skill control, controlling the target value to enter a locked state, wherein the target value remains unchanged for a predetermined time in the locked state.

In a possible embodiment, the information indication component comprises a component body, and the display module 41, when displaying the information indication component, is configured for:

displaying the component body, and determining a target rendering mode for the component body based on the target value, the target rendering mode used to indicate the target value; and rendering the component body in accordance with the target rendering mode.

In a possible embodiment, the component body comprises sub-areas respectively corresponding to a plurality of value intervals, and the display module 41 is configured for:

determining a target rendering region corresponding to the target value, the target rendering region comprising a first sub-area and/or at least a portion of a second sub-area, wherein the first sub-area comprising a sub-area corresponding to another value interval with values smaller than the target value interval, the second sub-area comprising a sub-area corresponding to the target value interval; and determining a target rendering effect and rendering the target rendering region.

In a possible embodiment, the first target skill corresponding to the first skill control is associated with first change information.

The first response module 42, when updating the target value, is configured for:

determining the target change information of the target value based on the first change information associated with the first target skill; and updating the target value based on the target change information.

In a possible embodiment, the value interval corresponding to the target value is associated with second change information.

The first response module 42, when determining the target change information of the target value based on the first change information associated with the first target skill, is configured for:

determining the target change information of the target value based on the first and second change information.

In a possible embodiment, the plurality of value intervals is associated with adjustment information.

The first response module 42, when determining skill effect information of a first target skill corresponding to the first skill control based on the target value interval corresponding to the target value, is configured for:

determining, based on the target value interval corresponding to the target value, target adjustment information associated with the target value interval; and determining the skill effect information of the first target skill corresponding to the first skill control based on the target adjustment information.

In a possible embodiment, the target adjustment information comprises gain information for an original skill effect of the first target skill.

The first response module 42, when determining the skill effect information of the first target skill corresponding to the first skill control based on the target adjustment information, is configured for:

determining the skill effect information of the first target skill based on the gain information for the original skill effect of the first target skill and the original skill effect of the first target skill.

In a possible embodiment, the target adjustment information further comprises state reduction information for the target virtual object.

The first response module 42 is further configured for updating a real-time state of the target virtual object based on the state reduction information for the target virtual object.

In a possible embodiment, the plurality of value intervals includes the first value interval.

The first response module 42 is further configured for, in response to a time length when the target value falls into the first value interval being greater than a first predefined time length, controlling the target value to be updated to a predefined value, and/or updating a real-time state of the target virtual object.

In a possible embodiment, the first response module 42 is further configured for:

in response to the target value remaining unchanged in a second predefined time, controlling the target value to increase or decrease at a predetermined rate.

In a possible embodiment, the display module 41 is further configured for displaying a regular attack control on the display interface, the regular attack control is associated with a plurality of attack types, the plurality of value intervals comprises a second value interval.

The first response module 42 is further configured for, in case that the target value falls into the second value interval, in response to a trigger operation for the first skill control, changing an attack type associated with the regular attack control based on a skill type corresponding to the first skill control;

in response to a trigger operation for the regular attack control with the attack type changed, controlling the target virtual object to release an attack corresponding to the attack type.

In a possible embodiment, the first response module 42 is further configured for, in response to a trigger operation for the regular attack control with the attack type changed, controlling the attack type associated with the regular attack control to restore to an initial state.

In a possible embodiment, the first response module 42 is further configured for:

in response to the target value changes to fall into another value interval outside the second value interval, controlling the attack type associated with the regular attack control to restore to the initial state.

Figure 5:
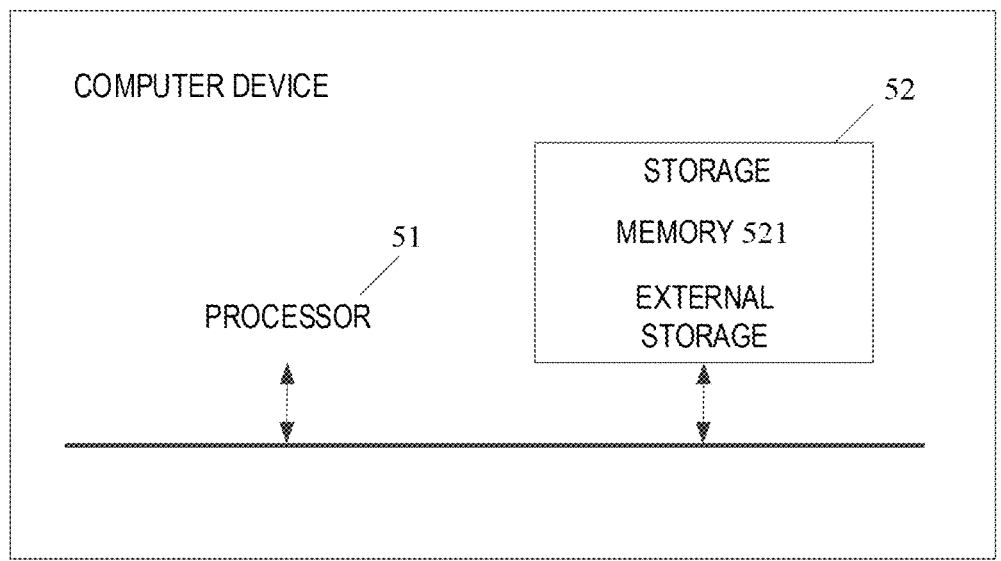
FIG. 5 shows a schematic diagram of the computer equipment provided in some embodiments of the present disclosure.

Embodiments of the present disclosure further provide a computer device, as shown in FIG. 5, which is a schematic diagram of the computer device structure provided by the embodiments herein, comprising:

Processor 51 and storage 52. The storage 52 stores machine-readable instructions that are executable by the processor 51, which is used to execute the machine-readable instructions stored in the storage 52, when the machine-readable instructions are executed by the processor 51, the processor 51 performs the following steps:

displaying, in a display interface of a terminal device, a virtual scene, a first skill control, a second skill control and information indication components, the virtual scene comprising a target virtual object, the information indication component associated with a target value and a plurality of value intervals;

in response to a trigger operation for the first skill control, determining skill effect information of a first target skill corresponding to the first skill control based on the target value interval corresponding to the target value, and controlling the target virtual object to release the first target skill based on the skill effect information; and updating the target value;

in response to a trigger operation for the second skill control, controlling the target value to enter a locked state, wherein the target value remains unchanged for a predetermined time in the locked state.

The above-mentioned storage 52 comprises memory 521 and external storage 522; The memory 521 here is also called internal memory, which is used to temporarily store the calculation data in the processor 51 and the data exchanged with the external memory 522 such as the hard disk. The processor 51 exchanges data with the external storage 522 through the memory 521.

The specific execution process of the above instructions may refer to the steps of the interaction control method described in embodiments of the present disclosure, and thus will not be repeated herein.

The embodiments of the present disclosure also provide a computer readable storage medium having a computer program stored thereon, and the computer program is executed by the processor during the steps of the interaction control method described in the above method embodiment. The storage medium may be a volatile or non-volatile computer readable storage medium.

The embodiments of the present disclosure also provide a computer program product that carries program codes, which include instructions that can be used to execute the steps of the interaction control method described in the above method embodiment. For details, please refer to the above method embodiment and thus will not be repeated herein.

In particular, the above-mentioned computer program product may be implemented in hardware, software, or a combination of them. In an optional embodiment, the computer program product may be specifically embodied as a computer storage medium, while in another optional embodiment, the computer program product may be specifically embodied as a software product, for example, a Software Development Kit (SDK), etc.

Those skilled in the art should clearly understand that for the convenience and briefness of the description, the specific working process of the system and apparatus described above may refer to the corresponding processes in the aforementioned method embodiments, and thus will not be repeated herein. It should be understood that in several embodiments provided in the present disclosure, the disclosed systems, apparatuses, and methods may be implemented in other ways. The apparatus embodiments described above are only schematic. For example, the division of the units as described is merely a division of logical functions, and there may be other division ways in the actual implementation. As another example, a plurality of units or components may be combined or integrated into another system, or some features may be ignored or not be executed. On the other hand, the coupling or direct coupling or communication connection displayed or discussed between each other may be indirect coupling or communication connection via some communication interfaces, apparatuses or units, which may be electrical, mechanical or in other forms.

The units described as separate components may or may not be physically separated, and the components displayed as units may or may not be physical units, that is, they may be located in one place, or alternatively distributed across a plurality of network units. Some or all of the units may be selected to achieve the purpose of the solution of the embodiments according to practical requirements.

In addition, various functional units in the embodiments of the present disclosure may be integrated into a single processing unit, or alternatively, the various functional units may physically exist separately, or two or more of the functional units may be integrated into one unit.

If the function is implemented in the form of a software functional unit and sold or used as an independent product, it may be stored in a non-volatile computer readable storage medium that is executable by a processor. On basis of this understanding, the technical solution of the present disclosure is essentially or the portion that contributes to the prior art or the portion of the technical solution may be reflected in the form of a software product, and the computer software product is stored in a storage medium including several instructions to cause a computer device (which may be a personal computer, server, or network device, etc.) to perform all or part of the steps of the methods described in various embodiments of the present disclosure. The aforementioned storage media include: USB flash disk, removable hard drive, read only memory (ROM), random-access memory (RAM), magnetic disk or optical disk and other media that can store program codes.

Finally, it should be noted that the above embodiments are only specific embodiments of the present disclosure, which are intended to illustrate the technical solution of the present disclosure without limitations. The protection scope of the present disclosure is not limited to this regard. Although detailed explanations of the present disclosure have been provided by referring to the aforementioned embodiments, the ordinary skilled in the art should understand that any skilled person familiar with the technical field can still modify the technical solution described in the aforementioned embodiments or easily envisage variants, or equivalently alternate some of the technical features within the technical scope disclosed in the present disclosure. These modifications, variants, or alternatives do not render separate the essence of the corresponding technical solution departing from the spirit and scope of the technical solution in the embodiments of the present disclosure, and should be encompassed within the protection scope of the preset disclosure. Therefore, the protection scope of the present disclosure shall be based on the protection scope of the claims.

What is claimed is:

1. A method of interaction control comprising:

displaying, in a display interface of a terminal device, a virtual scene, a first skill control, a second skill control and an information indication component, the virtual scene comprising a target virtual object, the information indication component associated with a target value and a plurality of value intervals;

in response to a trigger operation for the first skill control, determining skill effect information of a first target skill corresponding to the first skill control based on the target value interval corresponding to the target value, and controlling the target virtual object to release the first target skill based on the skill effect information; and updating the target value;

in response to a trigger operation for the second skill control, controlling the target value to enter a locked state, wherein the target value remains unchanged for a predetermined time in the locked state.

2. The method according to claim 1, wherein the information indication component comprises a component body, and wherein displaying the information indication component comprises:

displaying the component body, and determining a target rendering mode for the component body based on the target value, the target rendering mode used to indicate the target value; and rendering the component body in accordance with the target rendering mode.

3. The method according to claim 2, wherein the component body comprises sub-areas respectively corresponding to the plurality of value intervals, and wherein rendering the component body in accordance with the target rendering mode comprises:

determining a target rendering region corresponding to the target value, the target rendering region comprising a first sub-area and/or at least a portion of a second sub-area, wherein the first sub-area comprises a sub-area corresponding to another value interval with values smaller than the target value interval, the second sub-area comprises a sub-area corresponding to the target value interval; and determining a target rendering effect and rendering the target rendering region.

4. The method according to claim 1, wherein the first target skill corresponding to the first skill control is associated with first change information;

and updating the target value comprises:

determining target change information of the target value based on the first change information associated with the first target skill; and updating the target value based on the target change information.

5. The method according to claim 4, wherein the value interval corresponding to the target value is associated with second change information, and determining the target change information of the target value based on the first change information associated with the first target skill comprises:

determining the target change information of the target value based on the first and second change information.

6. The method according to claim 1, wherein the plurality of value intervals is respectively associated with adjustment information, and determining skill effect information of a first target skill corresponding to the first skill control based on the target value interval corresponding to the target value comprises:

determining, based on the target value interval corresponding to the target value, target adjustment information associated with the target value interval; and determining the skill effect information of the first target skill corresponding to the first skill control based on the target adjustment information.

7. The method according to claim 6, wherein the target adjustment information comprises gain information for an original skill effect of the first target skill, and determining the skill effect information of the first target skill corresponding to the first skill control based on the target adjustment information comprises:

determining the skill effect information of the first target skill based on the gain information for the original skill effect of the first target skill and the original skill effect of the first target skill.

8. The method according to claim 1, wherein the target adjustment information further comprises state reduction information for the target virtual object, and the method further comprises:

updating a real-time state of the target virtual object based on the state reduction information for the target virtual object.

9. The method according to claim 1, wherein the plurality of value intervals comprises a first value interval, and the method further comprises:

in response to a time length when the target value falls into the first value interval being greater than a first predefined time length, controlling the target value to be updated to a predefined value, and/or, updating a real-time state of the target virtual object.

10. The method according to claim 1, further comprising:

in response to the target value remaining unchanged in a second predefined time length, controlling the target value to increase or decrease at a predetermined rate.

11. The method according to claim 1, wherein a regular attack control is displayed on the display interface, the regular attack control is associated with a plurality of attack types, the plurality of value intervals comprises a second value interval, and the method further comprises:

in case that the target value falls into the second value interval, in response to a trigger operation for the first skill control, changing an attack type associated with the regular attack control based on a skill type corresponding to the first skill control; and in response to a trigger operation for the regular attack control with the attack type changed, controlling the target virtual object to release an attack corresponding to the attack type.

12. The method according to claim 11, further comprising:

in response to a trigger operation for the regular attack control with the attack type changed, controlling the attack type associated with the regular attack control to restore to an initial state.

13. The method according to claim 12, further comprising:

in response to the target value changes to fall into another value interval outside the second value interval, controlling the attack type associated with the regular attack control to restore to the initial state.

14. A computer device comprising a processor and a memory, wherein the memory stores machine-readable instructions executable by the processor, the processor is configured to execute the machine-readable instructions stored in the memory, and when the machine-readable instructions are executed by the processor, the processor carries out the steps of a method of interaction control comprising:

displaying, in a display interface of a terminal device, a virtual scene, a first skill control, a second skill control and an information indication component, the virtual scene comprising a target virtual object, the information indication component associated with a target value and a plurality of value intervals;

in response to a trigger operation for the first skill control, determining skill effect information of a first target skill corresponding to the first skill control based on the target value interval corresponding to the target value, and controlling the target virtual object to release the first target skill based on the skill effect information; and updating the target value;

in response to a trigger operation for the second skill control, controlling the target value to enter a locked state, wherein the target value remains unchanged for a predetermined time in the locked state.

15. The computer device according to claim of claim 14, wherein the information indication component comprises a component body, and wherein the step of displaying the information indication component comprises:

displaying the component body, and determining a target rendering mode for the component body based on the target value, the target rendering mode used to indicate the target value; and rendering the component body in accordance with the target rendering mode.

16. The computer device according to claim of claim 15, wherein the component body comprises sub-areas respectively corresponding to the plurality of value intervals, and wherein the step of rendering the component body in accordance with the target rendering mode comprises:

determining a target rendering region corresponding to the target value, the target rendering region comprising a first sub-area and/or at least a portion of a second sub-area, wherein the first sub-area comprises a sub-area corresponding to another value interval with values smaller than the target value interval, the second sub-area comprises a sub-area corresponding to the target value interval; and determining a target rendering effect and rendering the target rendering region.

17. The computer device according to claim of claim 14, wherein the first target skill corresponding to the first skill control is associated with first change information;

and the step of updating the target value comprises:

determining target change information of the target value based on the first change information associated with the first target skill; and updating the target value based on the target change information.

18. The computer device according to claim of claim 14, wherein the value interval corresponding to the target value is associated with second change information, and the step of determining the target change information of the target value based on the first change information associated with the first target skill comprises:

determining the target change information of the target value based on the first and second change information.

19. The computer device according to claim of claim 14, wherein the plurality of value intervals is respectively associated with adjustment information, and the step of determining skill effect information of a first target skill corresponding to the first skill control based on the target value interval corresponding to the target value comprises:

determining, based on the target value interval corresponding to the target value, target adjustment information associated with the target value interval; and determining the skill effect information of the first target skill corresponding to the first skill control based on the target adjustment information.

20. A non-transitory computer-readable storage medium storing a computer program thereon, wherein when the computer program is executed by a computer device, the computer device carrying carries out the steps of a method of interactive control comprising:

displaying, in a display interface of a terminal device, a virtual scene, a first skill control, a second skill control and an information indication component, the virtual scene comprising a target virtual object, the information indication component associated with a target value and a plurality of value intervals;

in response to a trigger operation for the first skill control, determining skill effect information of a first target skill corresponding to the first skill control based on the target value interval corresponding to the target value, and controlling the target virtual object to release the first target skill based on the skill effect information; and updating the target value;

in response to a trigger operation for the second skill control, controlling the target value to enter a locked state, wherein the target value remains unchanged for a predetermined time in the locked state.

* * * * *